United States Patent
Tanizaki et al.

(10) Patent No.: US 7,839,306 B2
(45) Date of Patent: Nov. 23, 2010

(54) MAP DISPLAY METHOD

(75) Inventors: Masaaki Tanizaki, Nishitokyo (JP); Kishiko Maruyama, Kokubunji (JP); Shigeru Shimada, Kodaira (JP)

(73) Assignees: Hitachi, Ltd., Tokyo (JP); Xanavi Informatics Corporation, Kanagawa (JP)

( * ) Notice: Subject to any disclaimer, the term of this patent is extended or adjusted under 35 U.S.C. 154(b) by 0 days.

(21) Appl. No.: 10/565,300

(22) PCT Filed: Aug. 18, 2004

(86) PCT No.: PCT/JP2004/011840
§ 371 (c)(1),
(2), (4) Date: Jan. 20, 2006

(87) PCT Pub. No.: WO2005/020186
PCT Pub. Date: Mar. 3, 2005

(65) Prior Publication Data
US 2006/0220923 A1 Oct. 5, 2006

(30) Foreign Application Priority Data
Aug. 22, 2003 (JP) .............................. 2003-298821

(51) Int. Cl.
*G08G 1/123* (2006.01)
*G01C 21/00* (2006.01)

(52) U.S. Cl. ................................ 340/995.1; 701/200

(58) Field of Classification Search .............. 340/995.1, 340/995.2, 601, 539.2, 539.22; 701/200
See application file for complete search history.

(56) References Cited

U.S. PATENT DOCUMENTS 5,121,326 A * 6/1992 Moroto et al. .............. 701/212

(Continued)

FOREIGN PATENT DOCUMENTS

EP 0 378 271 A1 1/1990

(Continued)

OTHER PUBLICATIONS

Noboru Babaguchi et al., "A System of Generating a Sketch Map Drawing and its Instructions To Support Route Understanding", The Transactions of the Institute of Electronics, Information and Communication Engineers, vol. J80-D-II, No. 3, Mar. 25, 1997, in Japanese, pp. 791-800.

(Continued)

*Primary Examiner*—Benjamin C Lee
*Assistant Examiner*—Sigmund Tang
(74) *Attorney, Agent, or Firm*—Stites & Harbison, PLLC; Juan Carlos A. Marquez, Esq

(57) ABSTRACT

A map display method whereby the contents of a road map displayed can be easily and clearly grasped regardless of the running conditions of a vehicle.

In a summarized map displayed on a display screen 10, an area including a vehicle position 11, a destination 13 and a guide route 12 between them is displayed in simplified fashion. At a position far from the destination, as shown in FIG. 2A, a summarized map of a wide area is displayed and objects including a road 14 and a facility 15 are limited to a greater degree. With the approach of the vehicle position 11 to the destination 13, as shown in FIG. 2B, the contraction scale is decreased and a summarized map of a middle area is displayed, while at the same time increasing the objects displayed. With a further approach of the vehicle position 11 to the destination 13, as shown in FIG. 2C, a narrower area is displayed in summarization, while at the same time displaying substantially all the objects, thereby making it possible to grasp the neighborhood of the destination 13 in detail.

22 Claims, 12 Drawing Sheets

U.S. PATENT DOCUMENTS

| | | | | |
|---|---|---|---|---|
| 5,583,494 | A * | 12/1996 | Mizutani et al. | 340/995.14 |
| 5,614,898 | A * | 3/1997 | Kamiya et al. | 340/995.24 |
| 5,652,706 | A * | 7/1997 | Morimoto et al. | 701/210 |
| 5,731,979 | A * | 3/1998 | Yano et al. | 701/211 |
| 5,732,385 | A * | 3/1998 | Nakayama et al. | 701/201 |
| 5,751,228 | A * | 5/1998 | Kamiya et al. | 340/988 |
| 6,006,161 | A * | 12/1999 | Katou | 701/212 |
| 6,016,110 | A * | 1/2000 | Takinami | 340/995.16 |
| 6,023,652 | A * | 2/2000 | Arakawa et al. | 701/201 |
| 6,061,003 | A * | 5/2000 | Harada | 340/995.15 |
| 6,067,502 | A * | 5/2000 | Hayashida et al. | 701/209 |
| 6,175,801 | B1 * | 1/2001 | Millington | 701/207 |

FOREIGN PATENT DOCUMENTS

| | | |
|---|---|---|
| JP | 01-161111 | 12/1987 |
| JP | 07-103779 | 10/1993 |
| JP | 2000-292190 | 4/1999 |
| JP | 2000-298029 | 4/1999 |
| JP | 2001-041765 | 7/1999 |

OTHER PUBLICATIONS

International Search Report of PCT/JP2004/011840 dated Nov. 16, 2004.

Office Action from German Patent Office dated Dec. 16, 2009, with English translation.

* cited by examiner

WIDE AREA

MIDDLE AREA

NARROW AREA

FIG.7

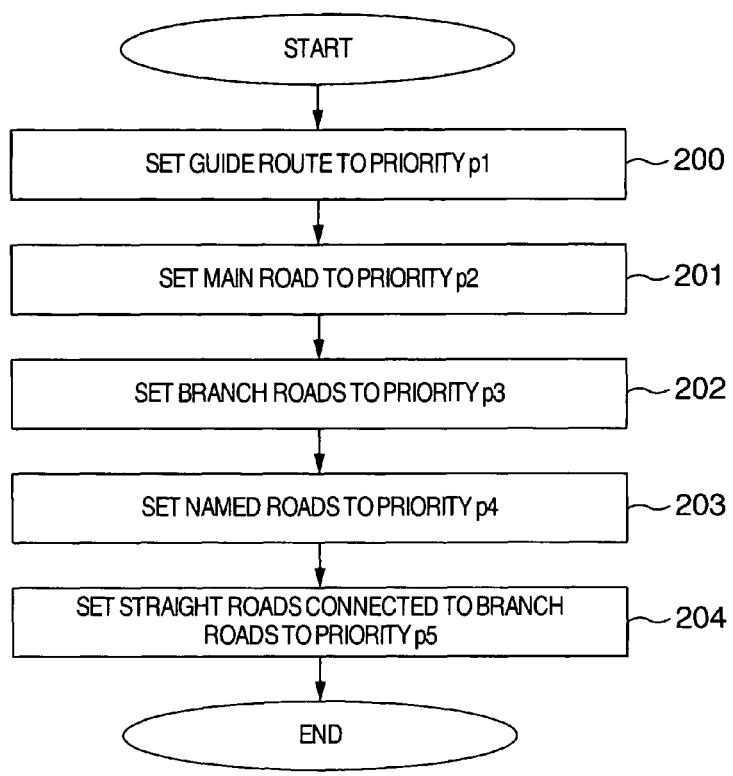

START
↓
SET GUIDE ROUTE TO PRIORITY p1 — 200
↓
SET MAIN ROAD TO PRIORITY p2 — 201
↓
SET BRANCH ROADS TO PRIORITY p3 — 202
↓
SET NAMED ROADS TO PRIORITY p4 — 203
↓
SET STRAIGHT ROADS CONNECTED TO BRANCH ROADS TO PRIORITY p5 — 204
↓
END

FIG.8

| ID | LAYER | CATEGORY | PATTERN TYPE | PATTERN DATA | NAME | PRIORITY |
|---|---|---|---|---|---|---|
| 1001 | 100 | 50 | polyline | {(xl,yl),...,(xn,yn)} |  | p1 |
| 1002 | 100 | 20 | polyline | {(xl,yl),...,(xn,yn)} | {(NAME,"ROUTE 20")} | p2 |
| 1003 | 100 | 20 | polyline | {(xl,yl),...,(xn,yn)} | {(NAME,"ROUTE 16")} | p3 |
| 1004 | 100 | 40 | polyline | {(xl,yl),...,(xn,yn)} | {(NAME,"FUCHU KAIDO")} | p4 |
| : | : | : | : | : | : | : |

FIG.12
|  | CHARACTER, SYMBOL | ROAD |
|---|---|---|
| RUNNING AT HIGH SPEED | a | c |
| RUNNING AT LOW SPEED | b | d |
FIG.13A
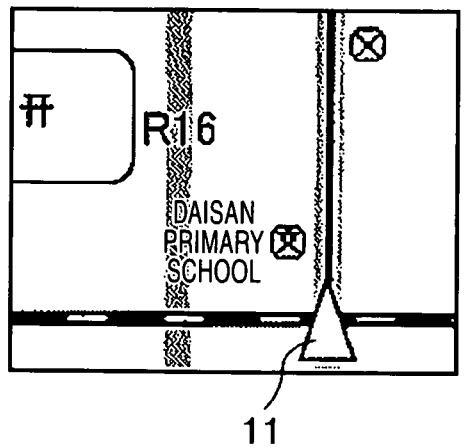
FIG.13B
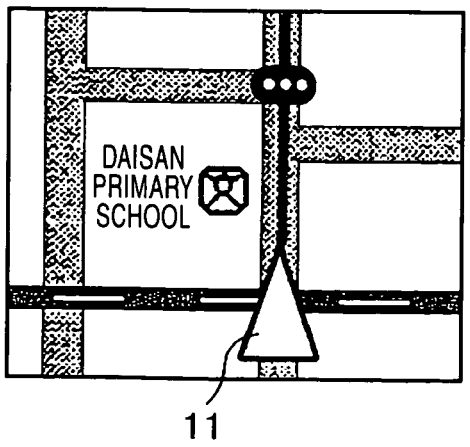

FIG.14
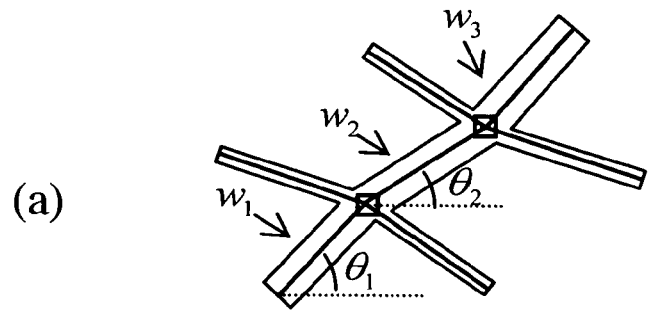
(a)
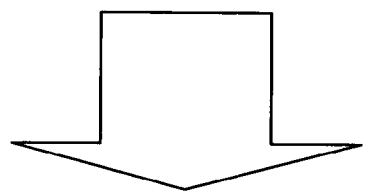
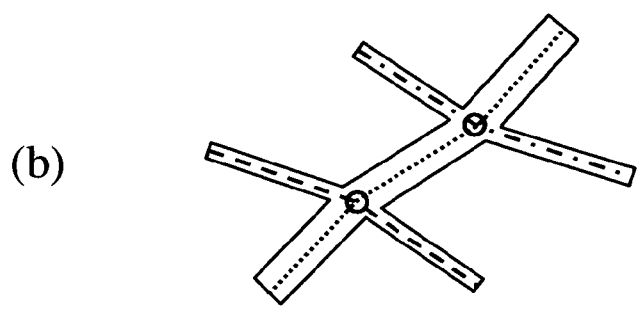
(b)
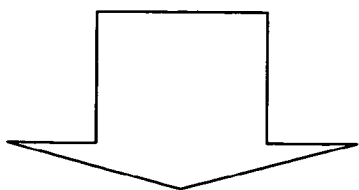
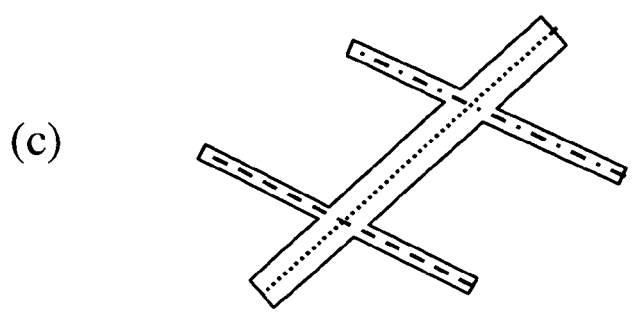
(c)

MAP DISPLAY METHOD

TECHNICAL FIELD

This invention relates to a map display method for measuring the present position of an automotive vehicle, displaying, on a display screen, a map including the present position and the present vehicle position on the map and guiding an occupant of the vehicle to a destination.

BACKGROUND ART

In the prior art, a car navigation apparatus for permitting the occupant to easily view the route to a destination and guiding the vehicle positively to the destination has been proposed (for example, JP-A-7-103779).

Patent Document 1: JP-A-7-103779

In the car navigation apparatus described in this Patent Document 1, the contraction scale of the road map displayed is changed with the progression of the vehicle to the destination, and the road map on display is progressively enlarged with the approach to the destination. In this conventional apparatus, the contraction scale of the road map on display is determined in such a manner that the present vehicle position is always displayed in the neighborhood of a corner of the display screen and the destination is displayed in the neighborhood of the diagonally opposite corner of the display screen in accordance with the ratio of the linear distance between the present vehicle position and the destination to the length of the diagonal line of the display screen.

DISCLOSURE OF THE INVENTION

Problem to be Solved by the Invention

In the car navigation apparatus described in Patent Document 1, the road map is displayed in more detail with the approach to the destination. In the case where the vehicle is running in an area somewhat distant from the destination, however, the marks indicating roads and facilities are displayed in fine detail on the road map covering a wide area, and so are the names of places, roads and facilities, which are very hard to read, especially, for an occupant driving the vehicle. The present position where the vehicle is running, therefore, may not be easily determined from the road map.

In the car navigation apparatus, the road map in the neighborhood of the present position of the vehicle can be also displayed. The road map of the same contraction scale, however, is viewed by the occupant differently on a toll road for high speed running and an ordinary road where the vehicle cannot be driven at high speed. From such a road map, the occupant of the vehicle running at high speed on a toll road may not be able to determine easily where his/her vehicle is located.

The object of this invention is to obviate this problem, and to provide a map display method whereby the contents of a road map on display can be easily and clearly grasped without regard to the running conditions of the vehicle.

Means for Solving the Problem

In order to achieve the above-mentioned object, according to a typical aspect of the invention, there is provided a map display method for detecting the present position of a vehicle and displaying a road map including a vehicle position mark indicating the detected present vehicle position and a guide route to be followed by the vehicle, wherein a summarized map indicating the guide route from the present vehicle position to the destination is displayed, which summarized map is summarized to a summarization degree corresponding to the distance from the present vehicle position to the destination.

Also, in this summarized map, the display amount of the roads and other display elements constituting the summarized map is changed in accordance with the summarization degree.

Also, according to this invention, there is provided a map display method for detecting the present position of a vehicle and displaying a road map including a vehicle position mark indicating the detected present vehicle position and a guide route to be followed by the vehicle, wherein a summarized map indicating a local area including the guide route from the present vehicle position is displayed, and in the local summarized map, the display amount of the roads and other display elements constituting the summarized map is changed in accordance with the vehicle running speed.

Also, in this local summarized map, the range of the display area is changed in accordance with the vehicle running speed.

ADVANTAGES OF THE INVENTION

According to this invention, a summarized map indicating the running route can be displayed in simplified fashion as compared with a plane map, and the contraction scale of the summarized map is changed to change the range of a display area in accordance with the distance from the present vehicle position to the destination, wherein the summarized map is easy to view and the relative position of the vehicle can be intuitively grasped wherever the vehicle may be located on the guide route.

Also, in view of the fact that the display amount of objects on the summarized map is changed in accordance with the distance between the vehicle position and the destination, the summarized map is easier to view wherever the vehicle is located on the guide route. The other objects, features and advantages of the invention will be made apparent by the description of embodiments of the invention taken in conjunction with the accompanying drawings.

BEST MODE FOR CARRYING OUT THE INVENTION

Embodiments of the invention are described below with reference to the drawings.

FIG. 1 is a block configuration diagram showing a car navigation apparatus using the map display method according to an embodiment of the invention. Reference numeral 1 designates a control unit, numeral 2 a position detector, numeral 3 a vehicle speed detector, numeral 4 a communication unit, numeral 5 a memory, numeral 6 a map data base, numeral 7 a display unit, numeral 8 a voice input/output unit and numeral 9 an input unit.

In this diagram, the map data of each area are stored in the map data base 6 and downloaded to the memory 5 provisionally from an external source through the communication unit 4. The map data stored in the memory 5 are stored in the map data base 6 under the control of the control unit 1. The map data of the whole nation is not initially required to be stored, but in the absence of the map data on the area where the vehicle with the car navigation apparatus mounted thereon (hereinafter referred to simply as the vehicle) is running, the map data of the particular area can be requested from a server (not shown) through the communication unit 4 and distributed from the server. Nevertheless, the whole map data can of course be stored in the map data base 6 in advance.

The map data base 6 has stored therein the road data and the display element data as the component elements of the map data, and by reading and combining the data of the component elements from the map data base 6, the road map data is obtained, whereby a road map is displayed on the display screen of the display unit 7. The display elements include the elements (symbols and names) of the facilities such as railroads, schools, convenience stores and bridges and the equipment including traffic signals.

The position detector 2 is a device such as a GPS (Global Positioning System) for detecting the position of the vehicle, and the vehicle speed detector 3 is a device for detecting the moving speed of the vehicle. In the position detector 2, the position of the vehicle (hereinafter referred to as the vehicle position) is detected at predetermined time intervals. The vehicle position is detected by the position detector 2 at the position detection timing based on the detection result of the vehicle speed detector 3.

The input unit 9 includes a mechanical switching means operated by the occupant and a touch switch displayed on the display screen of the display unit 7. The occupant, by operating the input unit 9, can input a command for the desired operation of the car navigation apparatus.

The control unit 1 is for controlling the various parts for navigation based on the command from the input unit 9. The road map data corresponding to the vehicle position based on the position information from the position detector 2 and the vehicle speed information from the vehicle speed detector 3 is read from the map data base 6 and displayed on the display unit 7 together with a mark indicating the present vehicle position (i.e. the vehicle position mark). According to this embodiment, the road map data can be displayed on the display unit 7, though not explained in detail, in any of various forms including a normal plane display in which the road map is displayed in the normal two-dimensional way, a bird's-eye display in which a two-dimensional road map is displayed as if viewed from a high view point, and a steric display in which, as a kind of a bird's-eye display, buildings, three-dimensional objects like buildings and ups and downs of the ground are displayed stereoscopically. Other display forms available include, as described later, a summarized display in which the required information is selectively picked up from a two-dimensional road map and roads, etc. are geometrically processed and displayed in a simplified fashion, and a two-screen display combining any of the display forms described above. In the case where a road map is displayed by other than the plane display, the control unit 1 processes the road map data read from the map data base 6 and displays it on the display unit 7.

Incidentally, the voice input/output unit 8 includes a speaker for outputting a voice guide or the like is output in operatively interlocked relation with the operation of guiding the vehicle on the road map displayed on the display screen of the display unit 7 and a reproducing device for a recording medium such as a disk.

Next, the display forms according to this invention are explained.

FIGS. 2A to 2C show a map display method according to an embodiment of the invention, in which summarized maps corresponding to the distance from the vehicle position to the destination are shown. Numeral 10 designates a display screen of the display unit 7, numeral 11 a vehicle position, numeral 12 a vehicle guide route, numeral 13 a destination, 14 roads other than the guide route 12, numeral 15 a symbol of a facility, and numeral 16 names of roads or facilities.

The summarized map according to this embodiment displays by summarizing the area from the present vehicle position to the destination. With the approach of the vehicle position to the destination, the contraction scale is increased while the map area displayed on the display screen of the display unit 7 is reduced.

The "contraction scale" is defined as the degree of contracting the map displayed on the display screen. Assume that the contraction scale of the map displayed without contraction on the display screen of the display unit 7 is 1. In the case where a map of a wider area is displayed on the display screen, the map is required to be contracted to the size of the display screen with a contraction scale of less than 1. For example, a map having an area four times as large as a map having the contraction scale $\alpha$ of 1, if to be displayed on the display screen, is reduced to one fourth with the contraction scale $\alpha$ of ¼.

The roads and the display elements in the summarized map are limited more, the longer the distance from the vehicle position to the destination and hence the larger the area to be displayed. Specifically, the summarized map facilitates the viewing of roads and display elements in spite of the change in contraction scale. The same roads and the same display elements are displayed, therefore, in substantially the same size for different contraction scales, without being superposed one on another. In order to display roads and display elements in this way, the display amount of the roads and the display elements is required to be limited and processed to improve the visibility depending on the contraction scale of the map. The degree of this limitation and the processing is determined by the degree of summarization indicating the degree to which the summarized map is summarized, i.e. the summarization degree.

In the case where a map (contraction scale $\alpha$ of ¼) of an area four times larger than the area of a map having the contraction scale $\alpha$ of 1 (hereinafter referred to as a reference map) and including the area of the reference map is displayed by being contracted to one fourth, for example, the roads and the display elements are also displayed by being contracted and become very difficult to view. In a summarized map, the display amount is reduced by reducing the number of roads and display elements displayed to one forth and the roads and the display elements after reduction are enlarged in a manner not superposed one on another to facilitate the viewing. The degree to which the number of roads and display elements is reduced and enlarged is determined by the summarization degree of the summarized map.

FIGS. 2A to 2C show examples of summarized map displayed on the display screen 10 of the display unit 7 (FIG. 1). In these summarized maps, symbols 15 of roads 14 or facilities and characters indicating the names of places or facilities (names 16) are displayed, together with a mark $\Delta$ indicating the present vehicle position 11 (vehicle mark), an asterisk indicating the destination 13 (destination mark) and a vehicle guide route 12 from the vehicle position to the destination.

According to this embodiment, the summarized map is displayed on the display screen 10 in such a manner as to include the guide route from the present vehicle position to the destination. Therefore, the contraction scale of the summarized map and the area displayed are changed in accordance with the distance from the present vehicle position to the destination.

FIG. 2A shows a summarized map with a long distance from the present vehicle position to the destination. In this case, the contraction scale is small and a wide area is displayed by being summarized. In this wide-area summarized map, the guide route 12 is displayed, together with a main road 14, a railroad 17, a symbol 15 indicating a river and a main facility and names 16 thereof which provide easily visible marks for the occupant driving the vehicle. Also, on the summarized map, the roads and display elements are limited and processed to facilitate the viewing without difficulty.

According as the distance from the present vehicle position to the destination is shortened and the contraction scale is increased while the area indicated by the summarized map is narrowed, the display amount of the roads and the display elements is limited to lesser degree. In a summarized map for a middle area as shown in FIG. 2B, for example, a road 14a crossing the guide route 12 also comes to be displayed.

Further, with the approach of the guided vehicle to the destination 13, as shown in FIG. 2C, a road map of a narrow area is displayed. This narrow-area road map, if 1 in contraction scale α, is not summarized, and all the roads and display elements are displayed together with the guide route 12. In this case, these roads are displayed realistically with the same width, length and shape (curve, etc.) as in the ordinary road map. Also, the display elements including facilities and the names thereof displayed on this summarized map are increased in number, thereby facilitating the detection of the destination 13.

The map having the contraction scale α of 1 is based on the map data obtained by cutting out an area that can be displayed on the display screen of the display unit 7 as it is from the map data base 6 (FIG. 1). Also in this case, the roads and display elements may be appropriately limited and processed.

In the series of summarized maps described above, with the change in distance between the running vehicle position 11 and the destination 13, the contraction scale is progressively increased and the display area narrowed, so that the summarized map is displayed in increasingly enlarged form. In this case, the vehicle position is detected at intervals of about one to several seconds by the position detector 2 and the vehicle speed detector 3 (FIG. 1), and based on this detection result, a summarized map is produced. In this case, therefore, the contraction scale of the summarized map is changed and the display area is narrowed at these time intervals, so that the summarized road map progressively enlarged is displayed on the display screen 10.

FIGS. 3A to 3C are diagrams showing the map display method according to another embodiment of the invention, and represent an example of two-screen display. Numeral 20 designates a summarized map, numeral 21 a plane map and 22 a traffic signal. The parts corresponding to those in FIGS. 2A to 2C are designated by the same reference numerals and not explained again.

FIG. 3A shows the two-screen display in the case where the distance from the vehicle position 11 to the destination 13 is long (far in distance). The display unit 7 (FIG. 1), together with the display screen 10, includes operation means such as a "two-screen" button 25, a "vehicle position" button 26, a "scale" button 27 and a "total route" button 28. By operating the "two-screen" button 25, the summarized map 20 is displayed in the left half and the plane map 21 in the right half, for example, of the display screen 10. Although the component elements (roads and display elements) of the summarized map 20 are similar to those of the summarized maps shown in FIGS. 2A to 2C, a summarized map of the neighborhood of the vehicle position is displayed by operating the "vehicle position" button 26.

The plane map 21 is an ordinary road map. By operating the "total route" button 28, however, the plane map 21 of the total route from the present vehicle position 11 to the destination 13 is displayed. Also, by operating the "scale" button 28 with the prevailing contraction scale as a minimum one, the contraction scale of the plane map 21 can be changed. As a result, with the increase in contraction scale, a narrower area is displayed in progressively enlarged form by the plane map 21. The plane map 21 thus displayed, however, always covers an area including the present vehicle position 11, and therefore the situation in the neighborhood of the vehicle position can be known in detail.

With the approach of the running vehicle 11 to the destination 13 and arrival at the position of a middle distance from the destination 13, as shown in FIG. 3B, the roads and display elements not displayed in the summarized map 20 shown in FIG. 3A come to be newly displayed in the summarized map 20, like in the summarized map 10 shown in FIG. 2B. The plane map 21, in contrast, is displayed in the same contraction scale unless the "scale" button 27 or the "total route" button 28 is operated. According as the vehicle runs, however, the area displayed is changed.

With the approach of the vehicle position 11 to the range of a predetermined distance from the destination 13, as shown in FIG. 3C, only the plane map 21 including the vehicle position 11 to the destination 13 is displayed in a one-screen display mode.

As described above, a local plane map of neighborhood of the vehicle position can also be displayed in two-screen display mode together with the summarized map. Further, in view of the fact that the contraction scale of the plane map can be changed, the vehicle position in terms of the approximate distance to the destination can be grasped on the summarized map, and by displaying the local plane map, the situation in the neighborhood of the present vehicle position can be known in detail, thereby making it possible to drive the vehicle more smoothly as guided by the apparatus.

As described above, the summarized map can be combined also with a bird's-eye display or a steric display in place of a plane map. In this case, the information on the neighborhood of the vehicle position in line with a more realistic visual field can be provided. Also, the display can be switched by the provision of a button to switch the screen in the menu bar.

With reference to FIG. 4, a specific example of the operation for display of a summarized map by the control unit 1 shown in FIG. 1 is explained.

In this drawing, first, a power switch not shown is turned on. Then, the vehicle position is measured by the detection output of the position detector 2 (step 100). When the destination is input from the input unit 9 (step 101), the route (guide route) from the vehicle position to the destination is retrieved using the map data including the data on the roads and display elements in the map data base 6 (step 102). From the vehicle position, the destination and the guide route thus retrieved, a display range including these factors to be displayed on the display screen 10 of the display unit 7 is determined (step 103).

A specific example of the method of determining this display range is explained with reference to FIG. 5.

In this drawing, from the vehicle position information obtained by the detection output of the position detector 2 and the destination information input from the input unit 9, the map data 30 including them is retrieved from the map data base 6, and the vehicle position 11 and the destination 13 are determined on the map data 30. Under predetermined conditions, the guide route 12 from the vehicle position 11 to the destination 13 is retrieved. Then, a square or rectangular area having four sides including a north-to-south straight line 32a passing through the vehicle position 11, the destination 13 or the guide route 12, whichever is located at the easternmost position, a west-to-east straight line 32b passing through the northernmost position, a north-to-south straight line 32c passing through the westernmost position and a west-to-east straight line 32d passing through the southernmost position, is detected as a route area 31. Further, an area including the route area 31 and having the same aspect ratio as the display screen 10 of the display unit 7 is determined as a map display area 33. This map display area 33 is determined as a display range at step 103 shown in FIG. 4.

On the other hand, a table is set for determining the display limit amount for each type of object (a display element such as character/symbol and a road) in accordance with the screen size of the display unit 7. This limit amount may be set in terms of the number or the ratio of the occupied area to the area of the display screen 10 (=Total area (number of pixels) occupied by display elements/Area of display screen 10 (number of pixels)). Table 1 shown below is an example in which the display limit amount of characters/symbols and roads is expressed by the number, and Table 2 by the ratio of occupied area.

TABLE 1

| Screen size | Characters/symbols | Roads |
|---|---|---|
| 6 inches | 30 | 50 |
| 7 inches | 35 | 60 |

TABLE 2

| Screen size (pixels) | Characters/symbols (%) | Roads (%) |
|---|---|---|
| 800 × 480 | 20 | 30 |
| 1440 × 234 | 30 | 35 |

In the case where the screen size of the display screen is 6 inches, for example, a maximum of 30 characters/symbols (or maximum of 20% in occupied area ratio) can be displayed, and a maximum of 50 roads (or maximum of 30% in occupied area ratio) can be displayed.

Returning to FIG. 4, upon determination of the display range as described above (step 103), the display limit amount of each object (road and display element making up the component elements of the map) shown in Tables 1 and 2 is read (step 104). Also, the map data of the display range (the map display area 33 determined in the manner described with reference to FIG. 5) is read from the map data base 6 and temporarily stored in the memory 5 (step 105).

This map data include object data as described above. The number of each type of objects read from the map data base 6 is determined (this number of each type of objects is called the number of objects in the initial value layer). This number of objects in the initial value layer is compared with the display limit amount obtained at step 104, and the maximum number of each type of objects actually displayed in the summarized map is adjusted to be equal to the display limit value. In this way, the roads and display elements actually displayed are determined from the objects in the initial value layer (step 106).

In this specific example, the display amount of objects is limited to the display limit amount shown in Tables 1 and 2. Based on this display limit amount, the degree to which the map is summarized, i.e. the summarization degree is changed in accordance with the contraction scale of the summarized map.

Specifically, in the case where a summarized map is displayed on the contraction scale $\alpha_1$, for example, assume that $n_1$ is the number of object "roads" (number of objects in the initial value layer) read from the map data base 6 to display the summarized map, and that M is the display limit value of this object ("50", for example, for the screen size shown in Table 1). In this summarized map, only M roads are displayed out of actually existing $n_1$ roads. Thus, this summarized map is summarized in this way as far as the object "roads" are concerned. The ratio $y_1$ of the roads displayed in this summarized map is given as $y_1 = M/n_1$, which indicates the degree to which the map is summarized, i.e. the summarization degree.

In the case where the summarized map is displayed on the contraction scale $\alpha_2$ ($<\alpha_1$), on the other hand, assume that the number of object "roads" in the initial value layer read from the map data base 6 is $n_2$ ($n_2 > n_1$, since $\alpha_2 < \alpha_1$ and therefore this summarized map has a wider area than the summarized map of contraction scale $\alpha_1$). Then, the summarization degree $y_2$ of this summarized map is given as $y_2 = M/n_2$. Since $y_1 > y_2$, the summarization degree y of the summarized map is varied with the contraction scale $\alpha$ of the summarized map.

In other words, the amount of objects displayed in the summarized map is limited in accordance with the summarization degree y. Thus, the map is summarized in accordance with the summarization degree.

In one method of determining the objects actually displayed from the objects in the initial value layer, the priority is set for each type of object, and the number of objects equal to the determined value is selected in the descending order of priority. Next, this is explained with reference to FIGS. 6 to 8 taking the road data as an example.

As shown in FIG. 6, assume that the object "roads" displayed in the summarized map are classified, as road types, into a road constituting the guide route 12, main roads 14a including a toll road and national and prefectural roads, and branch roads 14b connected as a branch to the guide route 12 such as a road 14c named for the purpose of tourism or the like, a straight connected road 14d connected linearly with a branch road and other types of roads. The priority is set for each type of these roads.

In setting the object "roads" actually displayed at step 106 in FIG. 4, the priority set for each type of the "road" as described above is used. An example of this priority is explained with reference to FIG. 7. First, the road constituting the guide route 12 is set to priority p1 (step 200), the main roads 14a are set to priority p2 (step 201), the branch roads 14b are set to priority p3 (step 202), the named roads 14c are set to priority p4 (step 203), the straight roads 14d connected to the branch roads are set to priority p5 (step 204), and the other roads are not set to any priority.

FIG. 8 is a diagram showing the road data to which priority is set in this way.

In this drawing, the road data include an ID (identification) 41 for identifying the road data, a layer 42 indicating that the type of an object is the "road", a category 43 indicating the road type (the route road, main road, etc. shown in FIG. 7), a pattern type 45 indicating the shape of the pattern for display of the road and a name 46 of the display elements. Further, the priority 47 is also included in the case where priority is set as described above.

In this case, the road data is taken as an example, and the type is assumed to be indicated by the layer "100". The category is expressed as "500" in the case where the type of the object "road" is the guide route 12, "400" for the main roads 14a, and "200" for the named roads 14c. Also, for other types of roads, the category is determined in accordance with each type thereof. The pattern type 44 indicates a polygonal line as "polyline" including a multiplicity of straight lines, and may be expressed, for example, as a "polygon". The pattern data 45 represents the road position indicated by latitude and longitude (or the ordinate and abscissa on an orthogonal coordinate system). A road, for example, is expressed by the coordinates of a train of constituent points thereof. Also, in the case where a road has a name (○○ toll road, national road No. XX, ΔΔ line, etc.), the particular name 46 is added.

Incidentally, although all the data shown in FIG. 8 are not essential, at least one of the layer 42 and the category 43 is required to specify the type. The pattern type 44 and the pattern data 45 represent the classification of the pattern type (dot, polygonal line, polygon, etc.) and the pattern data, and if capable of expressing the same contents, may be described collectively as one item. The name 46 is essential for indicating the name of the road along which the vehicle is running and the crossing roads. The priority 47 is added, if determined at the time of preparation of the map data base 6 (FIG. 1). By doing so, the priority setting process is simplified.

Returning to FIG. 4, in the case of the road data, the determined value obtained at step 104 may be the ratio (%) of the total display area of the roads to the display screen 10. At step 106, while adjusting to this determined value, the limit of the priority of the roads displayed is determined (step 106). In this case, "adjust" is defined as a process in which with the advance of priority to one lower order, the number of the roads or the area (number of pixels) occupying the display screen 10 before the particular priority is calculated, the ratio (%) between this area and the area of the display screen 10 is determined, the number of the roads or the occupied area is compared with the display limit amount, and then it is determined whether the display limit amount is exceeded or not. In the case where the display limit amount is not exceeded, the priority is further advanced to one lower order and the number or the occupied area of roads to be displayed is increased, while in the case where the display limit amount is exceeded, the prevailing number of the roads on the lowest order of priority is reduced. As an alternative, the road data read from the map data base 6 are removed in the ascending order of priority to adjust to the display limit amount.

Incidentally, at step 106, the priority of the roads may be changed and the roads to be displayed can be adjusted in accordance with the situation of the guide route or the crossing roads.

At step 104 of FIG. 4, the display limit amount of each object is uniquely determined by the size (Table 1) or the occupied area ratio (Table 2) of the display screen 10. Alternatively, the map data base 6 is provided for each of the wide area, middle area and the narrow area shown in FIGS. 2A to 2C into which the contraction scale is divided, and the display limit amount of each object is set for each division map data base (in short, the map data is divided into the map data for the wide area, middle area and the narrow area, and the display limit amount of each object is set for each division map data). Then, in accordance with the contraction scale of the road map to be displayed, the display limit amount of an object is changed. Also within this contraction scale classification, the display limit amount may of course be changed in accordance with either the sizes shown in Tables 1 and 2 or the size of the display screen 10.

Once an object to be displayed is determined in this way, as described later, the data processing is executed for processing the shape (thickness of roads, size of characters or symbols, etc.) of the particular object, i.e. a road or a display element. Further, the data processing is executed for arranging the processed display elements on the processed roads in such a manner as not to be superposed one on another (step 107). Thus, a summarized map having the display elements geometrically processed as shown in FIGS. 2A to 2C, FIGS. 3A to 3C is displayed on the display screen 10 of the display unit 7 as shown in FIGS. 2A to 2C, FIGS. 3A to 3C (step 108).

Next, the vehicle position 11 is measured (step 109), it is determined whether the vehicle is located on the guide route 12 or not (step 110), and in the case where the vehicle is so located, the display range is determined from the measured vehicle position 11 and the destination 13 (step 103). For the display range thus determined, the operation from step 104 is repeated. In the case where the vehicle is not located on the guide route 12 (i.e. in the case where the route is changed), a new guide route is retrieved (step 102) and the operation from step 103 is repeated.

By doing so, the vehicle position is detected at intervals of about one or several seconds at step 110, and the operation from step 103 or 102 is repeated. For each repetitive operation, a new summarized map updated is displayed on the display screen 10.

By the way, according to this specific example, the process of reading the map data from the map data base 6 is executed (step 105) after the process of step 104 in FIG. 4. Nevertheless, following step 103, the process of step 105 for reading the map data from the map data base 6 is executed, after which the process of step 104 may be executed.

In this specific example, the number or the occupied area ratio of objects displayed is constant regardless of the contraction scale of the summarized map. Next, another example in which they are not constant but variable is explained with reference to FIG. 9. In FIG. 9, steps 100 to 103 are similar to steps 100 to 103 in FIG. 4, and steps 107 to 110 similar to steps 107 to 110 in FIG. 4. Specifically, the process of steps 104 to 106 in the flowchart shown in FIG. 4 is replaced by the process of steps 300 to 307 in the flowchart shown in FIG. 9. Therefore, the parts included in the flowchart of FIG. 4 are not explained, and the processing operation of steps 300 to 304 is explained.

In FIG. 9, as explained with reference to FIG. 4, once the display range of the map to be displayed on the display screen 10 of the display unit 7 is determined (step 103), the contraction scale $\alpha$ ($0<\alpha\leq1$) for displaying the map in this display range on the display screen 10 is determined (step 300). This contraction scale $\alpha$ is multiplied by a coefficient k ($0<k\leq1$) to determine an adjust value z ($=k\cdot\alpha$) (step 301). This coefficient k is preset and can be determined in accordance with the size of the display screen 10, for example, shown in Tables 1 and 2. The number of objects to be displayed on the display screen 10 is determined by this adjust value z. In the case where there are too many objects to be displayed on the display screen 10, however, k can be reduced, and vice versa.

This adjust value z has a tolerable minimum value $z_{min}$ set therein. The adjust value z, when holding the relation $z_{min}\leq z$ (step 302), constitutes the summarization degree y (step 303), while in the case where $z<z_{min}$ (step 302), the particular tolerable minimum value $z_{min}$ constitutes the summarization degree y (step 304). In the case where the distance from the present position to the destination is long and the wide-area map is reduced to a great measure (to a sufficiently small contraction scale $\alpha$) and displayed, for example, only a few objects may be included in this particular area (such as in the case where the number of objects is few and remains substantially unchanged in spite of the fact that the distance to the destination is changed by the running vehicle and the display area is progressively narrowed). In such a case, assume that the coefficient k is small and the wide-area map is displayed by being greatly contracted (to a sufficiently small contraction scale $\alpha$). Then, the number of objects displayed is reduced in proportion to the adjust value $z=k\cdot\alpha$, and less information required to guide the vehicle becomes available. For this reason, the tolerable minimum value $z_{min}$ is determined as described above to prevent the number of objects displayed from being reduced at the distance end (sic).

Once the summarization degree y is determined in the aforementioned way, the number of each object in the initial value layer is determined in the display range of the map determined at step 103 from the map data base 6, and the number of the object to be displayed is determined from the number of the object in the initial value layer and the summarization degree y (step 305). Assuming that the number of an object "road" in the initial value layer in this display range is N, for example, the number n of this particular object to be displayed is given as n=N·y.

After that, the map data in the display range determined at step 103 is read from the map data base 6, and temporarily stored in the memory 5 (step 306). Then, the objects to be displayed are determined in the number for each object in accordance with the priority order, for example, set from the map data base 6 (step 307), and the process from step 107 is executed for the objects thus determined.

FIGS. 10A, 10B show objects in the display range changed by the summarization process shown in FIG. 4. FIG. 10A shows a summarized map 40*a* of a narrow area, and FIG. 10B a summarized map 40*b* of a middle area. Comparison between the summarized maps 40*a*, 40*b* apparently shows that the summarization process shown in FIG. 4 has the advantage that the number of objects displayed on the summarized maps 40*a*, 40*b* is substantially unchanged and always limited to a predetermined number.

In contrast, FIGS. 11A, 11B show objects in different display ranges due to the summarization process shown in FIG. 9. FIG. 11A shows a summarized map 41*a* of a narrow area, and FIG. 11B a summarized map 41*b* of a middle area. Comparison between the summarized maps 41*a*, 41*b* apparently shows that the summarization process shown in FIG. 9 results in a greater number of objects to be displayed for the middle-area summarized map 41*b* than for the narrow-area summarized map 41*a*. Of course, in accordance with the number of objects in the display range in the initial value layer, the number of objects to be displayed is greater for the narrow-area summarized map 41*a* than for the middle-area summarized map 41*b* in some cases, or the number of objects to be displayed is substantially equal between the narrow-area summarized map 41*a* and the middle-area summarized area 41*b* in other cases. In the summarization process shown in FIG. 9, however, the number of objects to be displayed is limited and therefore the road map displayed on the display screen 10 becomes also very easy to see as in the summarized map produced by the summarization process shown in FIG. 4. Nevertheless, this embodiment has another advantage that the relative positions of the objects in each area are maintained and the surrounding situation is easy to grasp.

As described above, in this specific example of display, the contraction scale of the summarized map is changed in accordance with the distance between the vehicle position and the destination, while at the same time changing the number of objects to be displayed thereon. Further, the number of objects to be displayed may be changed in accordance with the running speed of the vehicle. The display screen of the car navigation apparatus is viewed differently when running on a toll road at high speed and when running on an ordinary road slowly. While the vehicle is running on a toll road at high speed, the contents of the display screen are desirably understood by instantaneous viewing, while a more detailed situation is desirably grasped while running at low speed. When running at high speed, therefore, the number of objects such as facilities and equipment displayed is reduced as compared with the determined value obtained at step 105 shown in FIG. 4, so that objects high in priority order and easily visible are displayed in the summarized map. Incidentally, whether the vehicle is running at high speed or not is determined by a method in which the vehicle speed is detected from the detection output of the vehicle speed detector 3, and in the case where the detected vehicle speed is higher than a predetermined threshold value, the vehicle is determined as running at high speed, while the vehicle is determined as running at low speed in the case where the detected vehicle speed is not higher than the threshold value, or by a method in which whether the vehicle position detected by the position detector 2 is located on a toll road or not is determined based on the road data 40 (FIG. 8) stored in the map data base 6, and in the case where the vehicle is located on a toll road, the vehicle is determined as running at high speed, while the vehicle is otherwise determined as running at low speed.

As described above, in the case where a local summarized map is displayed, the display limit amount of objects on this summarized map is changed in accordance with the vehicle running speed. Therefore, a road map summarized in a manner easily visible in accordance with the vehicle running speed is provided, and the vehicle position can be intuitively grasped even when running at high speed. Further, the contraction scale of the summarized map is locally changed in accordance with the vehicle running speed, and so is the range of the display area. While the vehicle is running at high speed, therefore, even the situation comparatively far ahead can be grasped thereby facilitating the driving. Further, when the vehicle comes to a stop, the screen is easily visible and therefore the display limit amount of objects may be increased to display more objects. In this case, a summarized map having a larger contraction scale or a map having the contraction scale $\alpha=1$ (narrow-area map) can be displayed, whereby the situation in the neighborhood of the vehicle position can be grasped in more detail.

Also, according to this embodiment, a summarized map includes the whole guide route from the vehicle position to the destination. According to another embodiment, however, a local summarized map of the neighborhood of the vehicle position can be displayed (this corresponds to a summarized map of the plane map 21 shown in FIGS. 3A, 3B, for example). In this case, the contraction scale of the summarized map can be either fixed or, like in the plane map 21 shown in FIGS. 3A, 3B, can be changed by the operation of the occupant. With the change in contraction scale, the display range of the local summarized map is also changed (the smaller the contraction scale, the wider the display range displayed in the summarized map). The number of objects (or the occupied area ratio) displayed in this case, which is constant regardless of the contraction scale, may alternatively be switched continuously or in steps in accordance with the change in contraction scale.

Further, also in a local summarized map, the number of objects displayed (or the occupied area ratio) can be changed in accordance with the vehicle speed. For this purpose, as shown in FIG. 12, the defined data including the number a of characters or symbols displayed while the vehicle is running at high speed, the ratio c % which the road display area represents of the background of the display screen 10, the number b (a<b) of the characters or symbols displayed while the vehicle is running at low speed, and the ratio d % (c<d) which the road display area represents of the background of the display screen 10, are held in the map data base 6 (FIG. 1), and in accordance with the result of determination by the determination method for high-speed and low-speed running, the objects displayed are changed. Also, in this case, the display range of the local summarized map can be changed at the time of high-speed and low-speed running, so that while the vehicle is running at high speed, a summarized map of a wider area than the summarized map for the low-speed running shown in FIG. 13B can be displayed as shown in FIG. 13A. Also in this case, the contraction scale of the local summarized map can be changed continuously or in steps in accordance with the running speed, so that the higher the running speed, the wider the area displayed in the summarized map. As a result, the occupant can know the situation even at a position comparatively far ahead while the vehicle is running at high speed and covers a long distance within a short time.

Now, the geometric process (step 108) shown in FIG. 4 for preparing a summarized map is explained.

FIG. 14 is a diagram showing a specific example of the linearization process of a polygonal pattern.

In the linearization process according to this specific example, the linear pattern of a road or a railroad is expressed by a polygonal line and approximated by a straight line thereby to reduce the amount of the map information data. Now, the road linearization process is explained as an example.

A road is recognized as a polygonal line with the ends thereof constituting an intersection or a dead end. First, as shown in FIG. 14(*a*), the tilt angles $\theta_1$, $\theta_2$ of the line segments $w_1$, $w_2$ of the polygonal line with respect to X axis are determined, and by calculating the error between adjacent tilt angles, the linearity is detected. Based on the result of this processing, the line segments are classified into groups of high linearity, and as shown in FIG. 14(*b*), can be divided into a dotted line, a dashed line and a one-dot chain. Finally, as shown in FIG. 14(*c*), the line segments of each group are connected and linearized.

FIG. 15 is a diagram showing another specific example of the linearization process of a polygonal pattern.

FIG. 15(*a*) shows a starting point S, an ending point G and nodes P of a road. For this road, as shown in FIG. 15(*b*), a straight line SL is drawn to connect the starting point S and the ending point G, and let $L_1$ be the length thereof. From each node P, a normal PL is drawn to the straight line SL, and let $d_{1max}$ be the length of the longest normal PL. It is determined whether the evaluation formulae described below hold or not.

$$F_1 = d_{1max}/L_1 < \epsilon_1 \qquad (1)$$

$$F_2 = d_{1max} < \epsilon_2 \qquad (2)$$

where $\epsilon_1$, $\epsilon_2$ are evaluation functions.

The first evaluation function $\epsilon_1$ is a threshold value of the ratio between the length of the longest normal PL and the distance between starting point S and ending point G, and used for the number reduction process not dependent on scale. Therefore, the first evaluation function $\epsilon_1$ remains the same for different scales, as long as the polygonal line is in the same shape. The second evaluation function $\epsilon_2$, on the other hand, is a threshold value of the length of the longest normal PL, and in the case where the scale range (maximum magnification) is determined, provides an effective number reduction process. This process is effective for removing minor unevennesses.

In the case where the evaluation formulae (1), (2) hold, the polygonal line is replaced by the straight line SL and the process is finished.

In the case where at least one of the evaluation formulae (1), (2) fails to hold, on the other hand, as shown in FIG. 15(*c*), the straight lines $SL_1$, $SL_2$ connecting the node $P_1$ associated with the longest normal PL and the starting point S and the ending point G are drawn, and further, the normal PL is drawn from each node P to these two straight lines $SL_1$, $SL_2$. Then, let $d_{2max}$, $d_{3max}$, be the length (nodes $P_2$, $P_3$) of the longest normal PL for each of the straight lines $SL_1$, $SL_2$, and it is determined whether the evaluation formulae (1), (2) hold or not. In the case where the evaluation formulae (1), (2) hold, the nodes P are removed and each polygonal line segment is replaced by a straight line.

In the example shown in FIG. 15(*c*), the evaluation formulae (1), (2) fail to hold for the longer polygonal line segment for which the straight line $SL_1$ is set, while the evaluation formulae (1), (2) hold for the shorter polygonal line segment for which the straight line $SL_2$ is set. For the shorter polygonal line segment, therefore, the node P is removed and replaced by the straight line $SL_2$.

With regard to the longer polygonal line segment, as shown in FIG. 15(*d*), the straight lines $SL_3$, $SL_4$ connecting the node $P_2$ associated with the longest normal PL, the starting point S and the node $P_1$ are drawn, and a similar process is executed for the two polygonal line segments of the straight lines $SL_3$, $SL_4$. In the case where this process satisfies the evaluation formulae (1), (2) hold, as shown in FIG. 15(*e*), the nodes P are removed, and each polygonal line segment is replaced by a straight line.

Comparison between FIGS. 15(*a*) and 15(*b*) apparently shows that in this specific example, a polygonal line having a multiplicity of nodes is replaced by a polygonal line having a fewer number of nodes. Thus, a complicated road is replaced by a road of a simple shape, and therefore the data amount of the map information is reduced.

Although embodiments are described above, this invention is not limited to them, and it is apparent to those skilled in the art that the invention can be variously altered or modified without departing from the spirit and the scope of the invention defined in the attached claims.

BRIEF DESCRIPTION OF THE DRAWINGS

FIG. 7 A flowchart showing a specific example of the method of setting the priority for each type of road shown in FIG. 6.

FIG. 8 A diagram showing a specific example of the road data in the map data base shown in FIG. 1.

FIG. 12 A diagram showing a specific example of the data for restricting the display amount of an object in accordance with the running speed in the map data base shown in FIG. 1.

FIG. 13A A diagram showing the map display method according to another embodiment of the invention.

FIG. 13B A diagram showing the map display method according to another embodiment of the invention.

FIG. 14 A diagram for explaining a specific example of the linearization process of a polygonal pattern at step 108 shown in FIG. 4.

Figure 1:
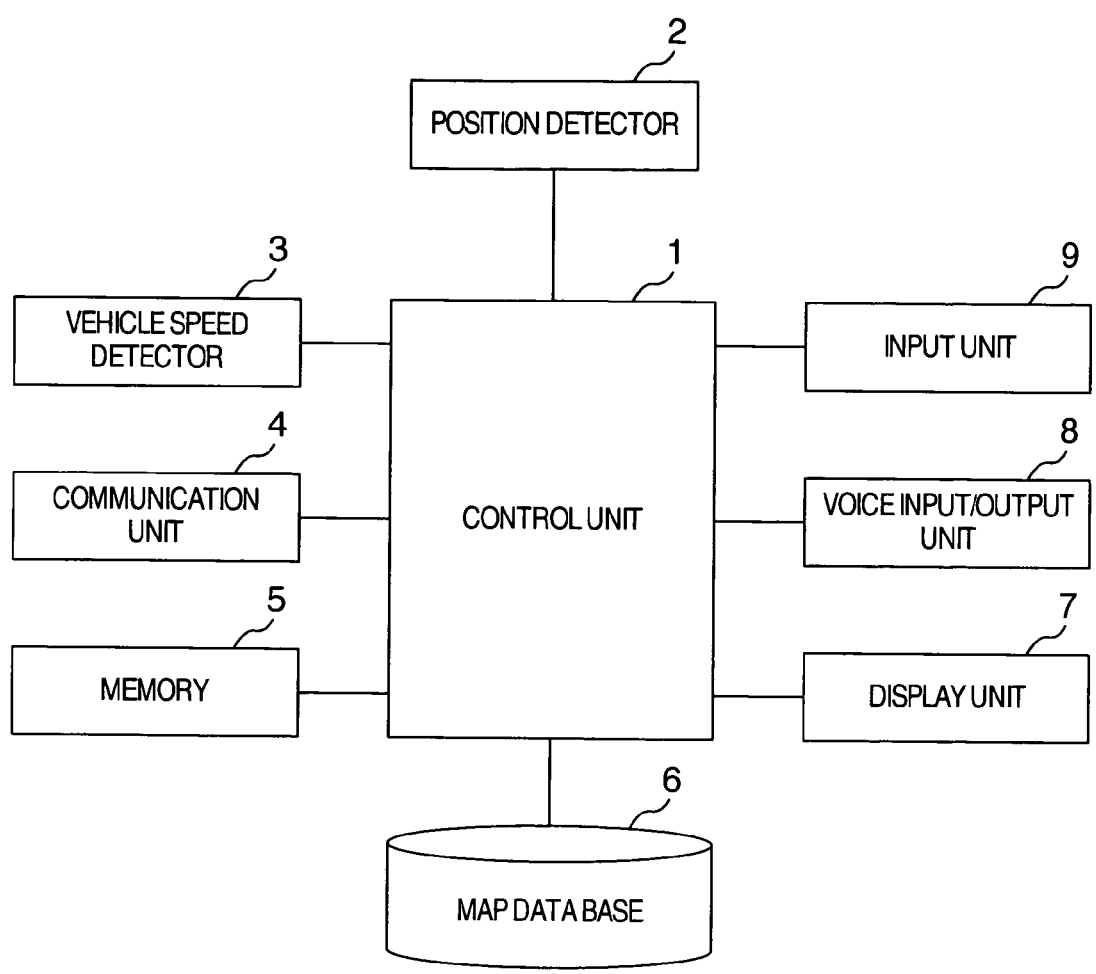
FIG. 1 A block configuration diagram showing an on-vehicle navigation apparatus using the map display method according to this invention.
Figure 2A:
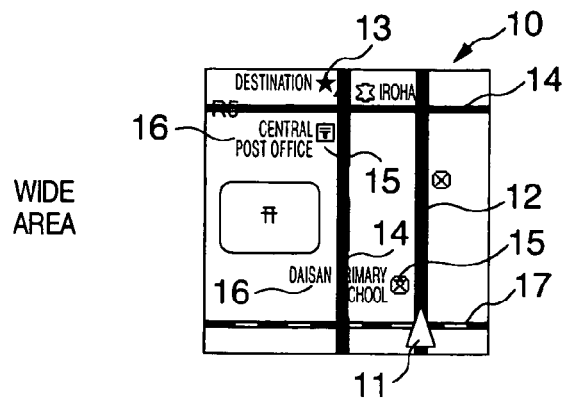
FIG. 2A A diagram showing a map display method according to an embodiment of the invention.
Figure 2B:
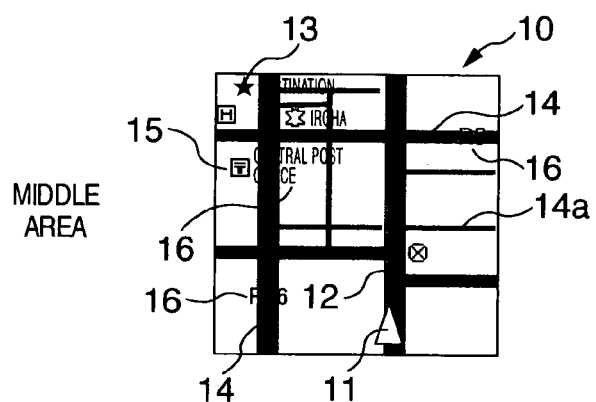
FIG. 2B A diagram showing a map display method according to an embodiment of the invention.
Figure 2C:
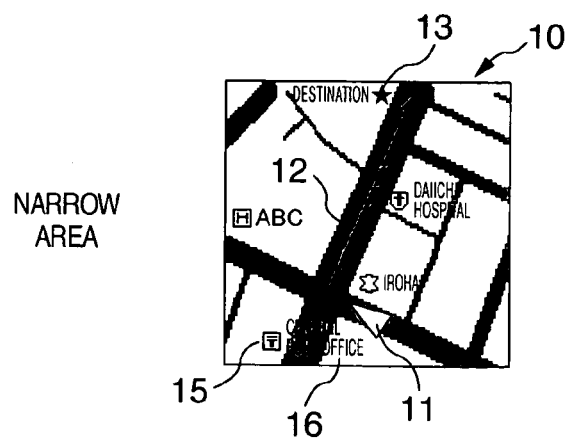
FIG. 2C A diagram showing a map display method according to an embodiment of the invention.
Figure 3A:
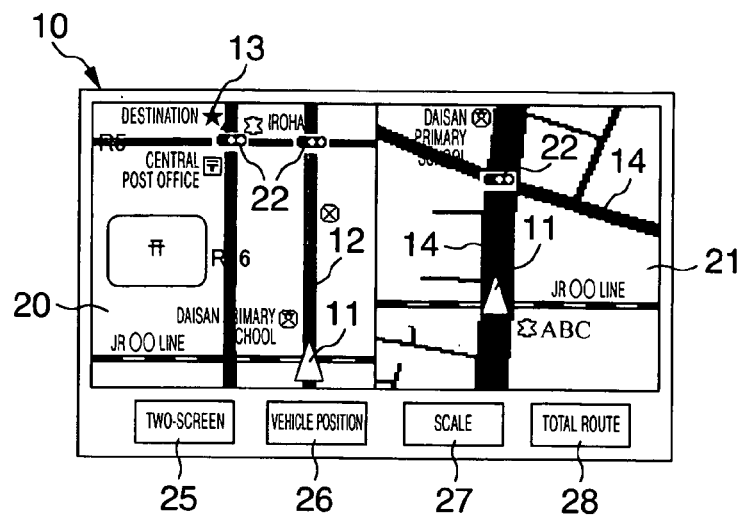
FIG. 3A A diagram showing a map display method according to an embodiment of the invention.
Figure 3B:
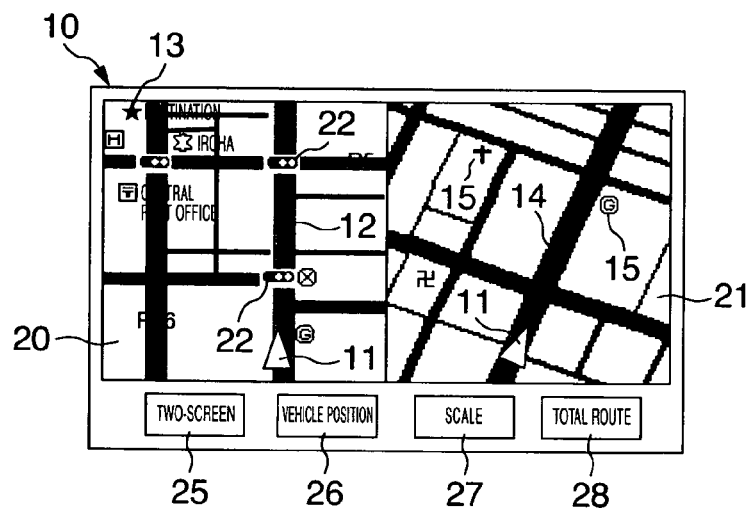
FIG. 3B A diagram showing a map display method according to an embodiment of the invention.
Figure 3C:
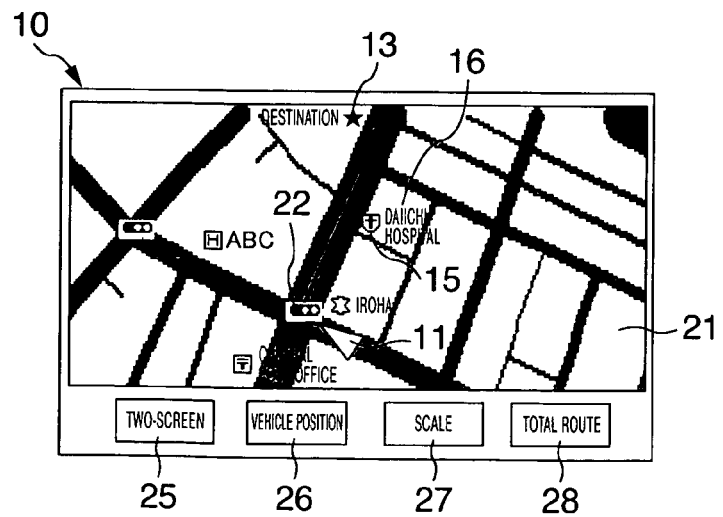
FIG. 3C A diagram showing a map display method according to an embodiment of the invention.
Figure 4:
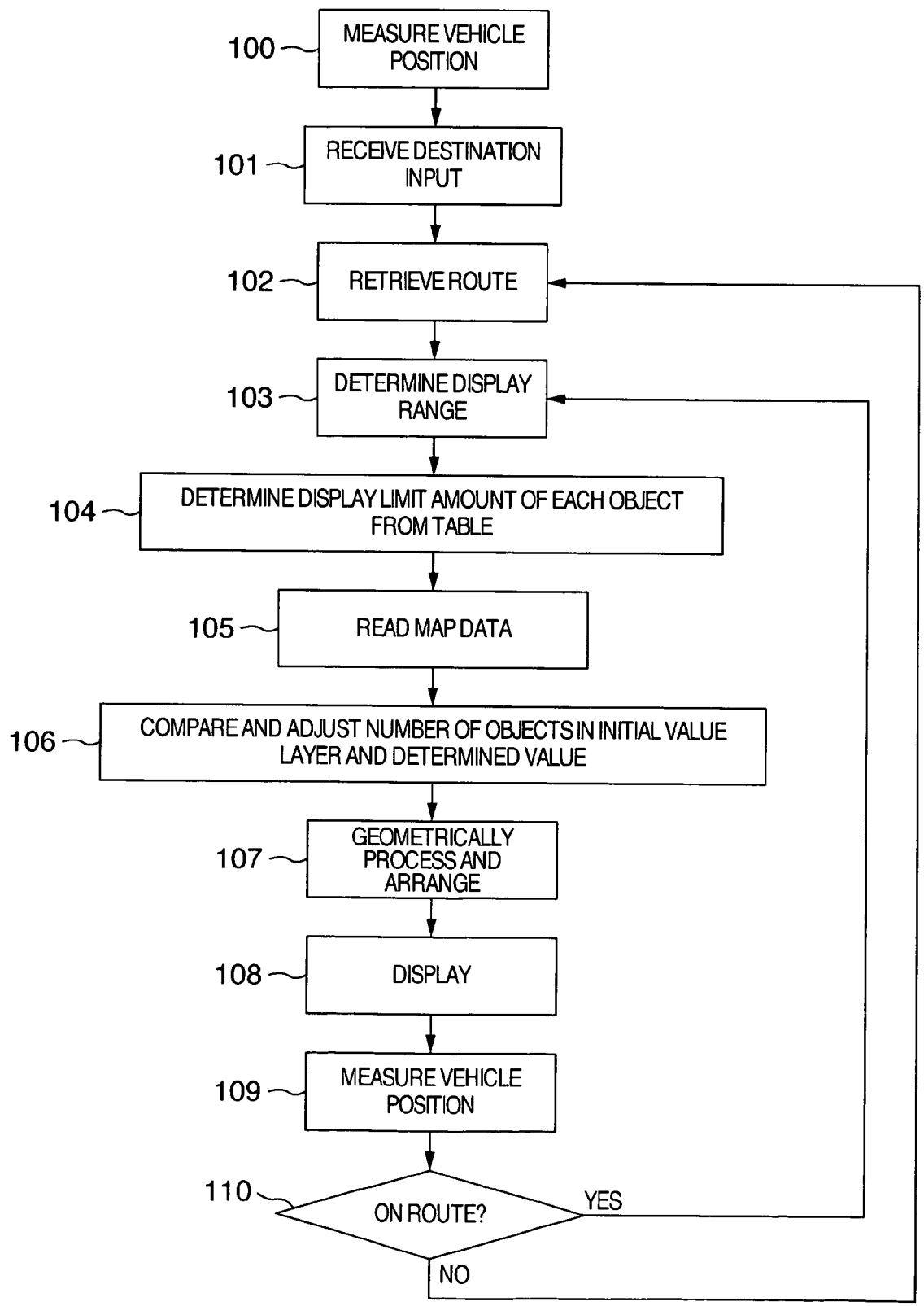
FIG. 4 A diagram showing a specific example of the processing operation for displaying the summarized maps according to the embodiments shown in FIGS. 2A to 2C, 3A to 3C.
Figure 5:
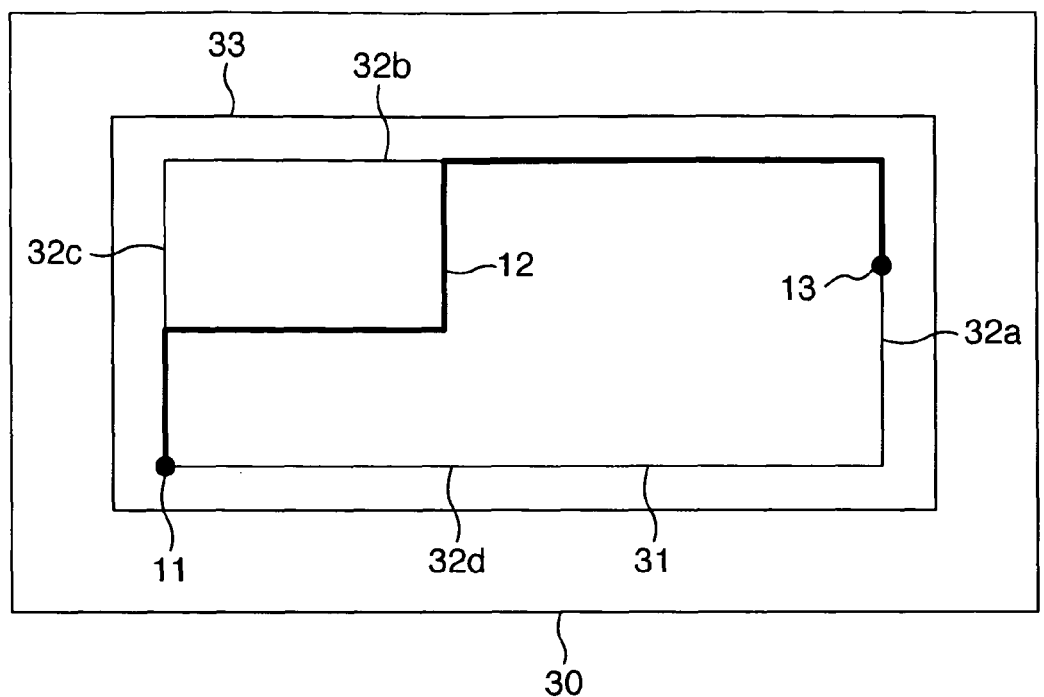
FIG. 5 A diagram showing a specific example of the method of setting the display range of a summarized map at step 103 in FIG. 4.
Figure 6:
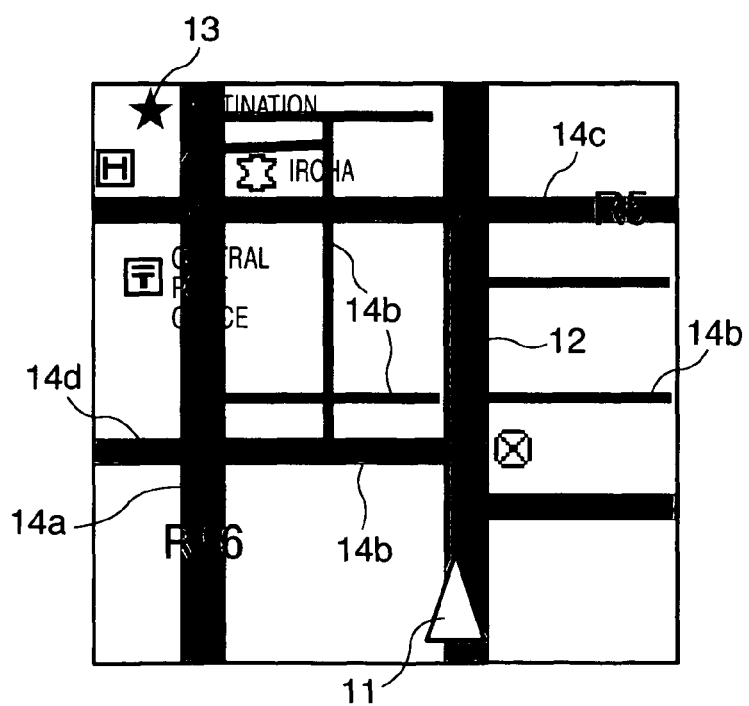
FIG. 6 A diagram schematically showing the types of road as an object in a summarized map.
Figure 9:
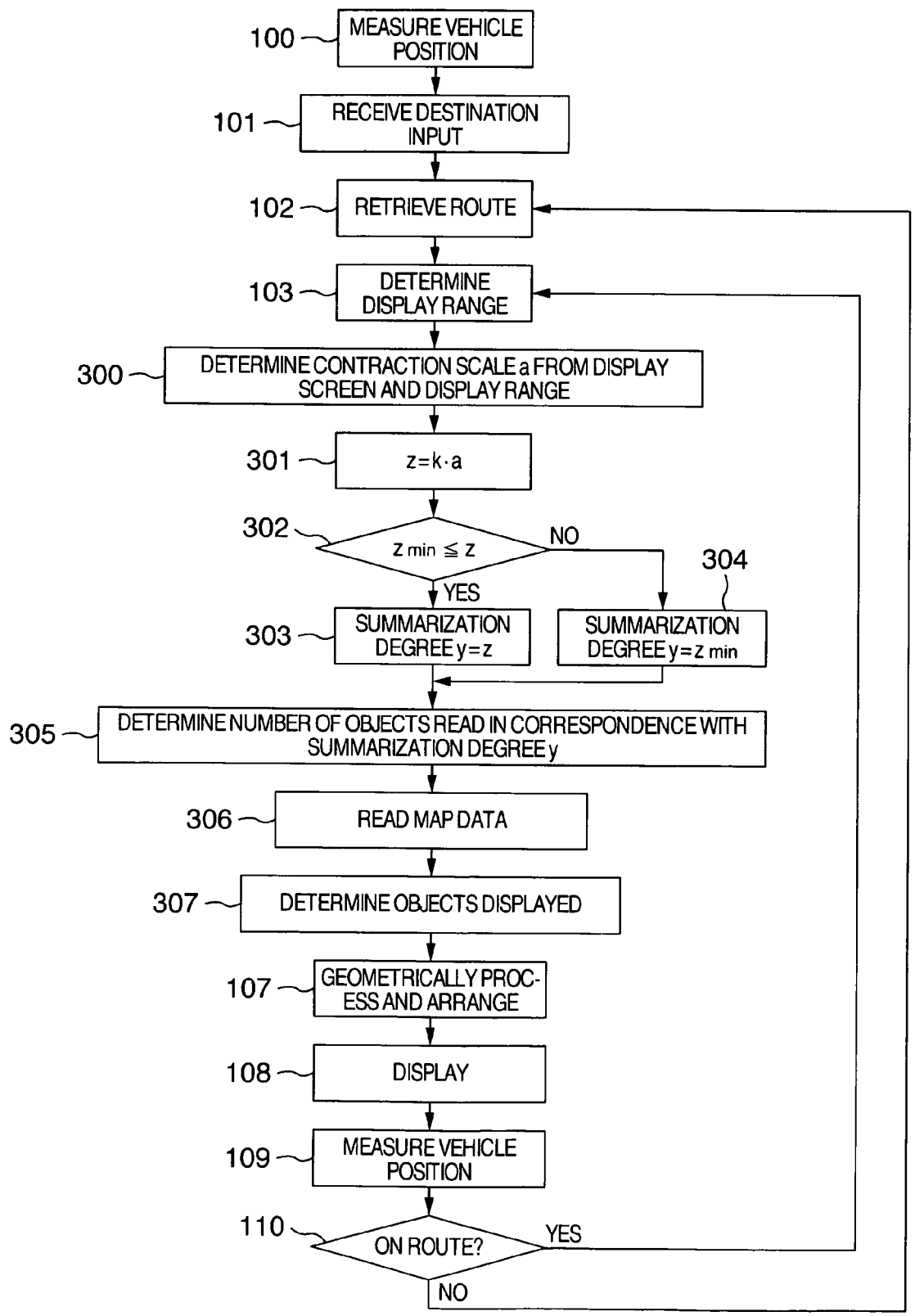
FIG. 9 A diagram showing another specific example of the processing operation for displaying the summarized maps according to the embodiments shown in FIGS. 2A to 2C, 3A to 3C.
Figure 10A:
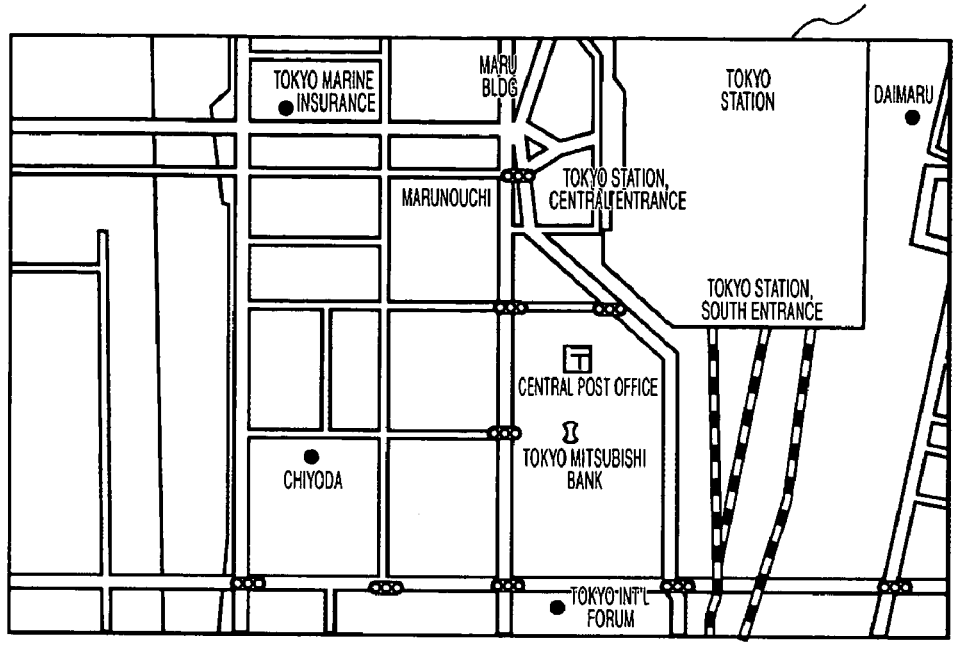
FIG. 10A A diagram showing the objects in a summarized map in a different display range due to the summarization process shown in FIG. 4.
Figure 10B:
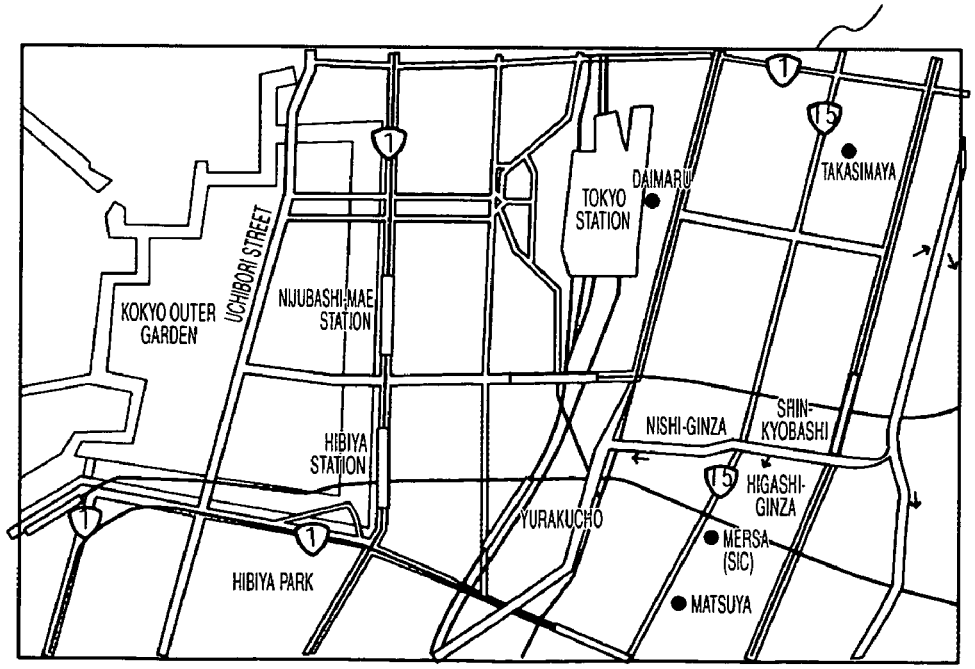
FIG. 10B A diagram showing the objects in a summarized map in a different display range due to the summarization process shown in FIG. 4.
Figure 11A:
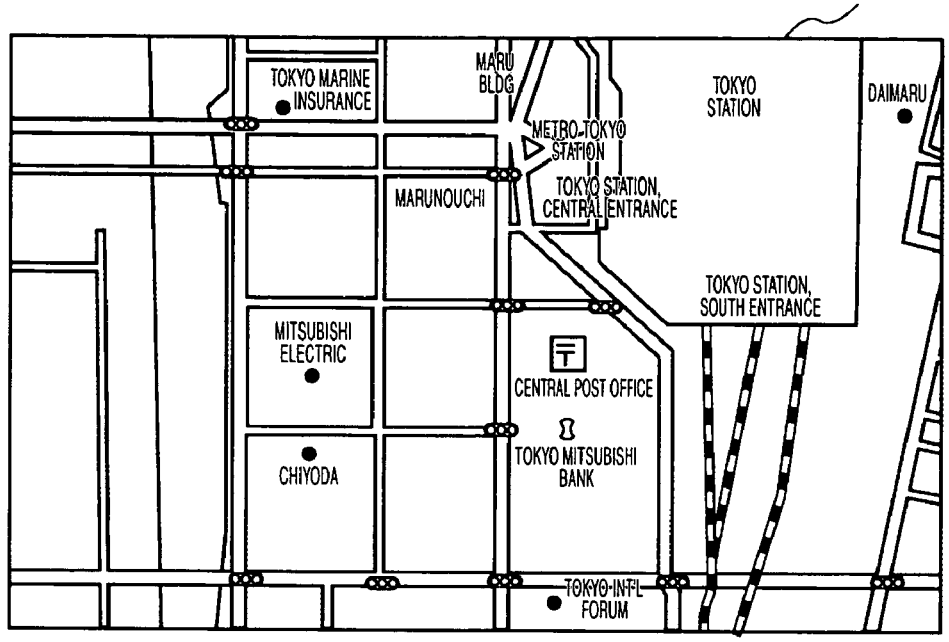
FIG. 11A A diagram showing the objects in a summarized map in a different display range due to the summarization process shown in FIG. 9.
Figure 11B:
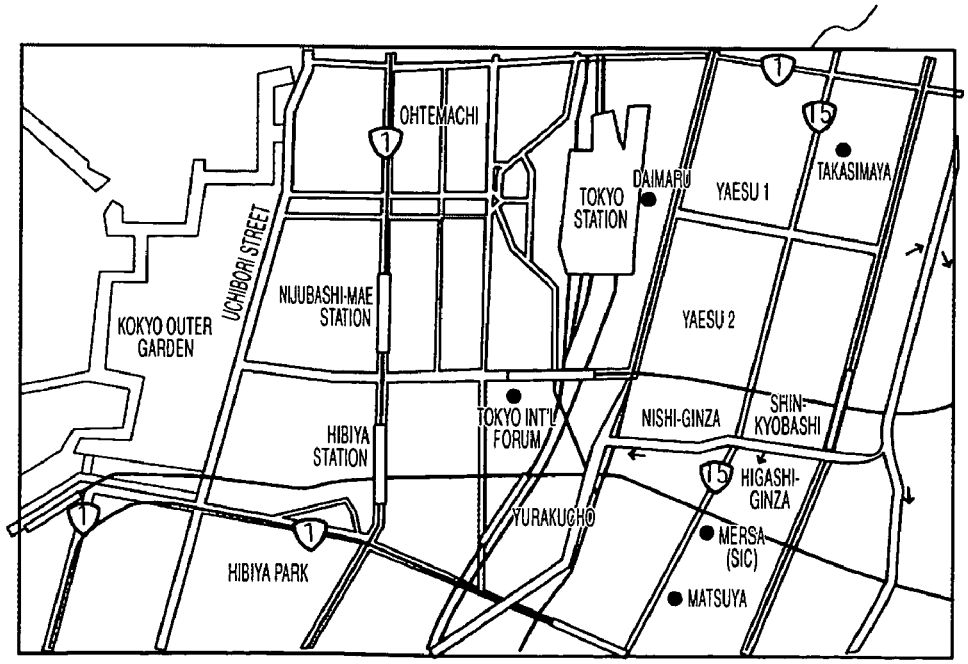
FIG. 11B A diagram showing the objects in a summarized map in a different display range due to the summarization process shown in FIG. 9.
Figure 15:
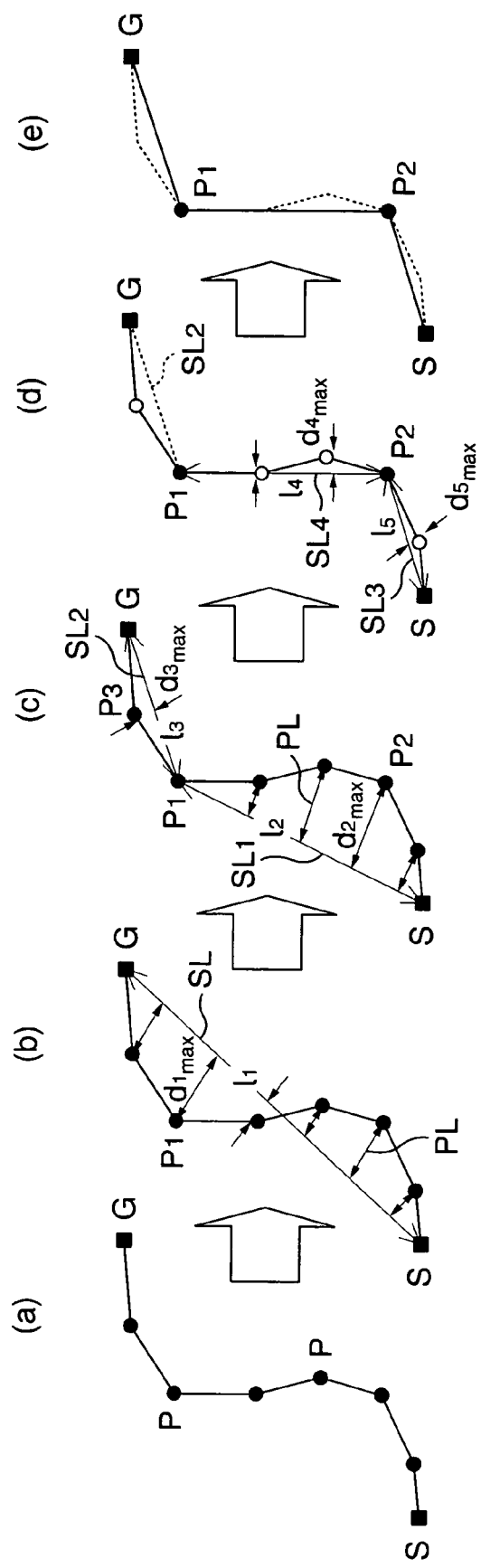
FIG. 15 A diagram for explaining another specific example of the linearization process of a polygonal pattern at step 108 shown in FIG. 4.

The invention claimed is:

1. A map display method for detecting the present position of a vehicle and displaying a road map including a vehicle position mark indicating the present position of the vehicle and a guide route along which the vehicle runs, comprising the steps of:
preparing a summarized map indicating the guide route with a summarization degree corresponding to a distance from the present vehicle position to a destination or a running speed of the vehicle;
displaying the summarized map thus prepared on a display screen; and
giving priorities to roads including each road traversed along the guide route, at least one main road and branch roads in that order in the summarized map;
storing an ID for identifying road data for each of the roads being given priorities, categories indicating road types for the roads, and the priorities set for the roads in a table,
wherein the priorities in said table set for the roads traversed along the guide route and crossing roads intersecting with the guide route in the main road and the branch roads are changed in accordance with a change in the guide route and the crossing roads existing in an area displayed in the summarized map due to a change in the present position and the running speed of the vehicle,
wherein the summarized map is prepared by selecting at least one road on the guide route and at least one road of the crossing roads from the roads based on the changed priorities, and
wherein each of the number of objects displayed in the display screen and the ratio of the occupied area of the displayed objects to the area of the display screen is changeable in accordance with the running speed of the vehicle by using the changing priorities.

2. A map display method according to claim 1, wherein the objects are displayed in the summarized map always within a predetermined limit amount.

3. A map display method according to claim 1, wherein a limit amount of the objects displayed in the summarized map is predetermined, and the summarized map is prepared with the objects displayed therein always not more than the limit amount.

4. A map display method according to claim 1, wherein a road map of another display form can be displayed in a second display screen.

5. A map display method according to claim 2, wherein a road map of another display form can be displayed in a second display screen.

6. A map display method according to claim 4, wherein the road map of the another display form is a local plane map of a neighborhood of the present vehicle position.

7. A map display method according to claim 5, wherein the road map of the another display form is a local plane map of a neighborhood of the present vehicle position.

8. A map display method according to claim 6, wherein a contraction scale of the local plane map is variable.

9. A map display method according to claim 7, wherein a contraction scale of the local plane map is variable.

10. A map display method according to claim 2, wherein the limit amount is the number of the objects or a ratio of an area of the display screen occupied by the objects.

11. A map display method according to claim 1, wherein a range of the area displayed in the summarized map is changed in accordance with the running speed of the vehicle.

12. A map display method for detecting a present position of a vehicle and displaying a road map including a vehicle position mark indicating the present position of the vehicle and a guide route along which the vehicle runs, comprising the steps of:
preparing a summarized map indicating the guide route with a summarization degree corresponding to a distance from the present position of the vehicle to a destination or a running speed of the vehicle;
displaying the summarized map prepared on a display screen;
giving priorities to roads including roads traversed along the guide route, a main road and a branch road in this order in the summarized map;
storing an ID for identifying road data for each of the roads being given priorities, categories indicating road types for the roads, and the priorities for the roads in a table,
changing the priorities in said table set for the roads traversed along the guide route and crossing roads intersecting with the guide route in the main road and the branch road in accordance with a change in the guide route and the crossing roads existing in an area displayed in the summarized map due to a change in the present position and the running speed of the vehicle; and
preparing the summarized map by selecting at least one road on the guide route and at least one road of the crossing roads from the roads based on the changed priorities,
changing a number of objects or an occupied area ratio of objects displayed in the display screen in accordance with the running speed of the vehicle by using the changing priorities, and
wherein a number of the selected roads does not exceed a limit number, the limit number being predetermined according to the summarization degree.

13. A map display method for detecting a present position of a vehicle and displaying a road map including a vehicle position mark indicating the present position of the vehicle and a guide route along which the vehicle runs, comprising the steps of:

preparing a summarized map indicating the guide route with a summarization degree corresponding to a distance from the present position of the vehicle to a destination or a running speed of the vehicle;

displaying the summarized map prepared on a display screen;

giving priorities to roads including roads traversed along the guide route, a main road and a branch road in this order in the summarized map;

storing an ID for identifying road data for each of the roads being given priorities, categories indicating road types for the roads, and the priorities for the roads in a table, changing the priorities in said table set for the roads traversed along the guide route and crossing roads intersecting with the guide route in the main road and the branch road in accordance with a change in the guide route and the crossing roads existing in an area displayed in the summarized map due to a change in the present position and the running speed of the vehicle; and preparing the summarized map by selecting at least one road on the guide route and at least one road of the crossing roads from the roads based on the changed priorities, allowing each of the number of objects and the ratio of the occupied area of the displayed objects to the area of the display screen to be changeable in accordance with the running speed of the vehicle by using the changing priorities, and wherein a number of the selected roads does not exceed a limit number, the limit number being predetermined according to the summarization degree.

14. A map display method according to claim 12, further comprising the steps of:

predetermining a limit amount of objects to be displayed in the summarized map; and preparing the summarized map with the number of the objects displayed therein within the limit amount.

15. A map display method according to claim 12, wherein a road map are displayed in a second display screen, each of the two display screens being displayed in different display forms.

16. A map display method according to claim 13, wherein a road map are displayed in a second display screen, each of the two display screens being displayed in different display forms.

17. A map display method according to claim 15, wherein the road map is a local plane map of a neighborhood of the present position of the vehicle.

18. A map display method according to claim 16, wherein the road map is a local plane map of a neighborhood of the present position of the vehicle.

19. A map display method according to claim 17, wherein a contraction scale of the local plane map is variable.

20. A map display method according to claim 18, wherein a contraction scale of the local plane map is variable.

21. A map display method according to claim 12, wherein a range of the area displayed in the summarized map is changed in accordance with the running speed of the vehicle.

22. A map display method according to claim 13, wherein a range of the area displayed in the summarized map is changed in accordance with the running speed of the vehicle.

* * * * *